(12) United States Patent
Popp et al.

(10) Patent No.: US 7,523,460 B2
(45) Date of Patent: *Apr. 21, 2009

(54) METHOD AND APPARATUS FOR GENERATING OBJECT-ORIENTED WORLD WIDE WEB PAGES

(75) Inventors: Nicolas Popp, Menlo Park, CA (US); Bruce Ong, San Francisco, CA (US)

(73) Assignee: Next Software, Inc., Cupertino, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 11/394,357

(22) Filed: Mar. 29, 2006

(65) Prior Publication Data

US 2006/0259910 A1   Nov. 16, 2006

Related U.S. Application Data

(63) Continuation of application No. 10/625,303, filed on Jul. 22, 2003, now Pat. No. 7,055,154, which is a continuation of application No. 08/515,057, filed on Aug. 14, 1995, now Pat. No. 6,651,108.

(51) Int. Cl.
*G06F 9/44* (2006.01)

(52) U.S. Cl. .................. 719/315; 719/316; 715/234

(58) Field of Classification Search .............. 719/310, 719/315, 316, 330; 715/234; 707/103 R; 709/203, 219
See application file for complete search history.

(56) References Cited

U.S. PATENT DOCUMENTS

| | | | | |
|---|---|---|---|---|
| 5,033,008 A | * | 7/1991 | Barker et al. | 715/210 |
| 5,237,679 A | * | 8/1993 | Wang et al. | 707/206 |
| 5,434,962 A | * | 7/1995 | Kyojima et al. | 715/234 |
| 5,485,568 A | * | 1/1996 | Venable et al. | 715/210 |
| 5,680,619 A | * | 10/1997 | Gudmundson et al. | 717/108 |
| 5,701,451 A | * | 12/1997 | Rogers et al. | 707/1 |
| 5,752,246 A | * | 5/1998 | Rogers et al. | 707/10 |
| 6,651,108 B2 | * | 11/2003 | Popp et al. | 719/315 |
| 7,055,154 B2 | * | 5/2006 | Popp et al. | 719/315 |

* cited by examiner

*Primary Examiner*—Van H Nguyen
(74) *Attorney, Agent, or Firm*—Van Pelt, Yi & James LLP

(57) ABSTRACT

In the present invention, HTML elements are mapped to objects in an object-oriented environment. Classes of objects are defined for each HTML element as well as the HTML document (or page). By providing a one-to-one mapping between each HTML element and object classes, HTML documents can be manipulated programmatically. The properties of each element are stored in instance variables of the associated object. Each object class can include methods to manipulate the HTML element within an HTML document.

20 Claims, 9 Drawing Sheets

Nicolas,

This is a list of your unread mail:

704 {
    Sender:    Bruce    
    Subject:    Meeting at 10:00 am
    Content:    Please contact me if you cannot attend a meeting this Thursday at 10:00 am.

---

Sender:    Karen    
Subject:    Meeting at 10:30 am
Content:    There will be a department meeting this Thursday at 10:30 am.

---

Sender:    Jeff    
Subject:    Lunch on Thursday
Content:    How about lunch this Thursday?

METHOD AND APPARATUS FOR GENERATING OBJECT-ORIENTED WORLD WIDE WEB PAGES

This is a Continuation of application Ser. No. 10/625,303, filed Jul. 22, 2003, now U.S. Pat. No. 7,055,154 which is a continuation of application Ser. No. 08/515,057, now U.S. Pat. No. 6,651,108, filed Aug. 14, 1995, which are hereby incorporated by reference.

BACKGROUND OF THE INVENTION

1. Field of the Invention

This invention relates to the generation of object-oriented world wide web pages.

2. Background

The Internet is a worldwide matrix of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, download a file from or send an electronic mail message to another computer/client using the Internet.

To retrieve a file on the Internet, a client must search for the file, make a connection to the computer on which the file is stored, and download the file. Each of these steps may involve a separate application and access to multiple, dissimilar computer systems. The World Wide Web (WWW) was developed to provide a simpler, more uniform means for accessing information on the Internet.

The components of the WWW include browser software, network links, and servers. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape, and Cello.

Information servers maintain the information on the WWW and are capable of processing a client request. Hypertext Transport Protocol (HTTP) is the standard protocol for communication with an information server on the WWW. HTTP has communication methods that allow clients to request data form a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request therefore, consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independent of any other request. The server has no recollection of any previous request.

An addressing scheme is employed to identify Internet resources (e.g., HTTP server, file or program). This addressing scheme is called Uniform Resource Locator (URL). A URL contains the protocol to use when accessing the server (e.g., HTTP), the Internet domain name of the site on which the server is running, the port number of the server, and the location of the resource in the file structure of the server.

The WWW uses a concept known as hypertext. Hypertext provides the ability to create links within a document to move directly to other information. To activate the link, it is only necessary to click on the hypertext link (e.g., a word or phrase). The hypertext link can be to information stored on a different site than the one that supplied the current information. A URL is associated with the link to identify the location of the additional information. When the link is activated, the client's browser uses the link to access the data at the site specified in the URL.

If the client request is for a file, the HTTP server locates the file and sends it to the client. An HTTP server also has the ability to delegate work to gateway programs. The Common Gateway Interface (CGI) specification defines the mechanisms by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard input, for example). The server forwards the data to the client using the HTTP.

A browser displays information to a client/user as pages or documents. A language is used to define the format for a page to be displayed in the WWW. The language is called Hypertext Markup Language (HTML). A WWW page is transmitted to a client as an HTML document. The browser executing at the client parses the document and produces a displays a page based on the information in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. An element can have attributes that specify properties of the element. Blocks or components include unordered list, text boxes, check boxes, radio buttons, for example. Each block has properties such as name, type, and value. The following provides an example of the structure of an HTML document:

<HTML>
      <HEAD>
      . . . element(s) valid in the document head
      </HEAD>
      <BODY>
      . . . element(s) valid in the document body
      </BODY>
    </HTML>

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of an another character, "/" that follows the "<" character.

HTML is a hierarchical language. With the exception of the HTML element, all other elements are contained within another element. The HTML element encompasses the entire document. It identifies the enclosed text as an HTML document. The HEAD element is contained within the HTML element and includes information about the HTML document. The BODY element is contained within the HTML. The BODY element contains all of the text and other information to be displayed. Other HTML elements are described in an HTML reference manual.

The prior art HTML is not object-oriented. An HTML element is contained as a string within a flat, ASCII file. An application must be written to manipulate an HTML file. It would be beneficial to have the ability to map HTML elements to classes of objects that define the behavior of HTML elements.

SUMMARY OF THE INVENTION

In the present invention, HTML elements are mapped to objects in an object-oriented environment. Classes of objects are defined for each HTML element as well-as the HTML document (or page). By providing a one-to-one mapping between each HTML element and object classes, HTML documents can be manipulated programmatically. The properties of each element are stored in instance variables of the associated object. Each object class can include methods to manipulate the HTML element within an HTML document.

An HTML document defines a World Wide Web page. An HTML document can be generated using HTML templates. Multiple HTML templates can be used to generate a single HTML document. An HTML template consists of HTML element statements. A parser parses an HTML template and generates an object tree.

The object tree is traversed during HTML document generation. When the HTML document is rendered, or generated, the root of the object tree is sent a message to create the document. The root object processes this message by creating its corresponding HTML element statement(s). The "create" message is then forwarded by the parent object to its children. This process is repeated until all of the objects in the object tree receive the message. Once all of the objects process the "create" message, the HTML document is generated.

An HTML document can also be generated without using an HTML template. An object tree can be created dynamically during runtime. For example, a root object (e.g., a PAGE object) is instantiated at runtime. During processing, additional HTML objects can be instantiated at inserted into the object tree. For example, a BODY object is inserted in the object tree as a child of the root object based on logic contained in an application procedure. Attributes of the BODY object can be set during application processing. Additional HTML objects can be added to the object tree in a similar manner until all of the objects have been assembled. As previously described, the HTML document is generated by sending a "create" message to the objects in the object tree.

An HTML template can include a server-side HTML extension known as the group extension. A group extension provides the ability to create a block of HTML statements. A name attribute of the group extension provides the ability to identify the group. The name attribute can be stored in a hash table. During processing, the group identity can be retrieved and used to traverse an object tree.

The group extension also ensures the scoping of named elements. A group object maintains a hash table that includes the named elements which are its members. The group element scopes the named elements within itself. Therefore, two elements having the same name in different groups are distinguishable. Each one is scoped to its respective group.

A declarations file is used in combination with the group extension. The declarations file contains additional definition for a group extension. An entry in the declarations file includes a label that links the entry to the group extension. The entry also declares an HTML object. That is, the class of the HTML object is defined. Properties of the HTML object can also be defined within the entry. Values for properties provided in the object class definition can be used to populate the properties in an instance of the object class instantiated for the group.

A declaration entry modifies its associated group by adding element to the group or modifying the elements that already exist in the group. For example, an HTML object, or element, declared in the entry inserts itself into the group that bears the same name as the declaration entry. Property values that are declared in the declaration entry are used to modify the HTML object's properties.

An instance of the group extension contained in an HTML template is not included in the HTML document that is sent to the client browser. Therefore, the client browser does not need to recognize the group extension. When the HTML document is rendered, the HTML objects contained within a group object render themselves to generate the HTML for the group. The HTML objects generate actual HTML statements within the HTML document. That is, the group does not generate HTML statements. However, the group transmits a message to its children (e.g., an HTML object that inserted itself within the group) to generate HTML statements.

A declaration entry may contain, for example, a declaration for a text string HTML object. The STRING HTML object is inserted into the group identified by the entry. When the HTML document is rendered, the STRING HTML object generates the HTML statements necessary to insert the text string into the HTML document.

A group extension also provides the ability to identify a block of HTML as a repeating subcomponent of the HTML document. The block identified by the group extension can be repeated multiple times within the HTML document. A repeating group can be used to render HTML statements that contain data that is retrieved from an external data source, for example.

DETAILED DESCRIPTION OF THE INVENTION

A method and apparatus for generating object-oriented World Wide Web pages is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
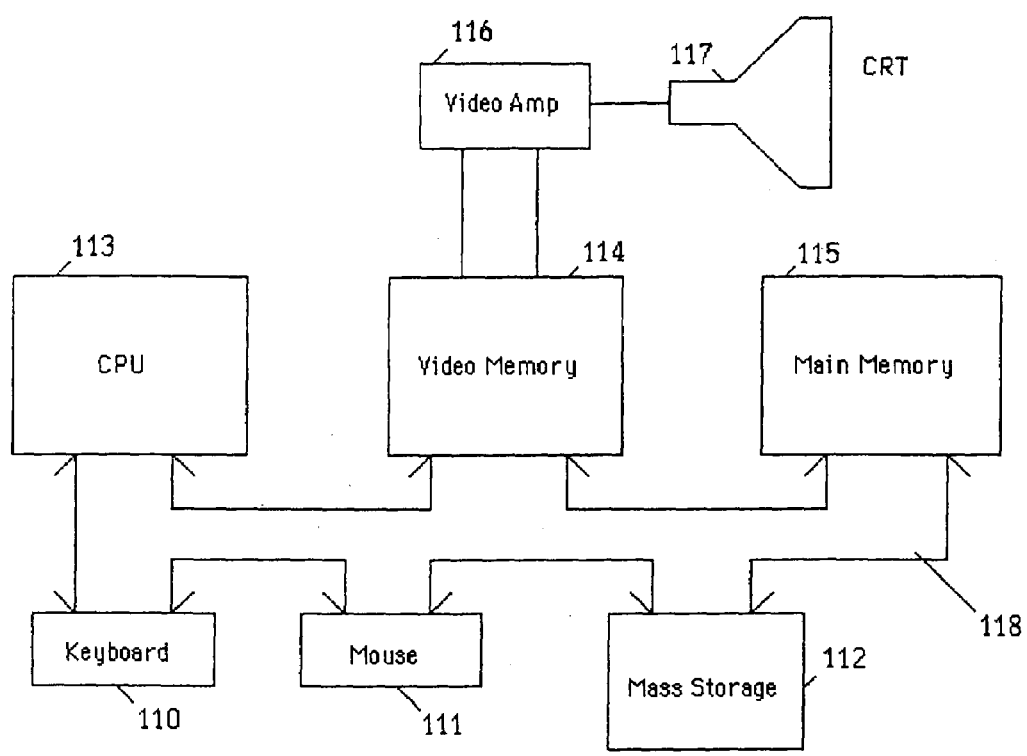
FIG. 1 provides an example of a general purpose computer to be used with the present invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the 680x0 processor or a microprocessor manufactured by Intel, such as the 80x86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment. When a general purpose computer system such as the one described executes the processes and process flows described herein, it is a means for generating an HTML page using object-oriented HTML elements.

In the present invention, HTML elements are mapped to objects in an object-oriented environment. Classes of objects are defined for each HTML element as well as the HTML document (or page). Each HTML element can be mapped to a corresponding object class (e.g., Objective C, C++, or SmallTalk object class). By providing a one-to-one mapping between each HTML element and object classes, HTML documents can be manipulated programmatically. The properties of each element are stored in instance variables of the associated object. Each object class can include methods to manipulate the HTML element within an HTML document.

The object-oriented approach used by the present invention provides the ability to dynamically generate a page, or HTML document. Some or all of a page can be generated based on input received in a receive form, generated at runtime, or retrieved from an external data source (e.g., database or electronic mail system).

As previously indicated, the present invention objectifies (Objective C, C++ objects, SmallTalk objects, etc.) HTML elements. By doing so, the HTML objects can be connected to other objects. That is, the HTML objects can be connected to objects in the business model (i.e., data model objects).

Figure 2:
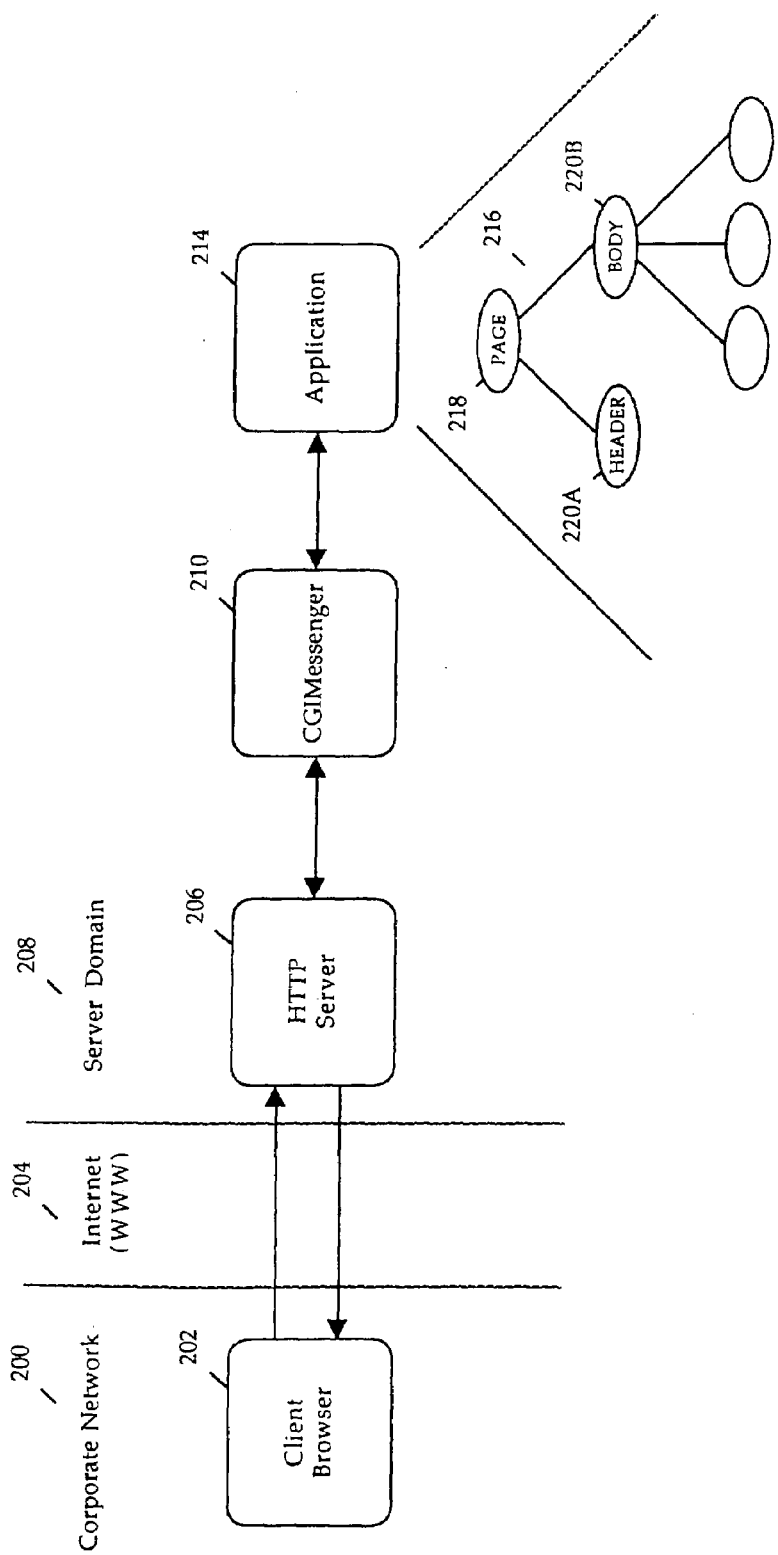
FIG. 2 provides a block-level diagram that illustrates components of the present invention.

The present invention provides the ability to access an application using any interface. For example, a client can access the same application via the Internet using a system running Windows, MAC/OS, Sun OS, NextStep, etc. Referring to FIG. 2, client 202 is resident on a corporate network 200. Corporate network 200 is a local area network comprised of personal computers such as client 202, for example. Client 202 executes a browser such as Netscape or Mosaic to interface with World Wide Web (WWW) 204. The browser executing on client 202 displays HTML pages transmitted to client 202 via WWW 204. When the client browser submits a request contained within an HTML page, the page is transmitted via WWW 204 to HTTP server 206. One attribute of the submitted page can be a Universal Resource Locator (URL). A URL specifies procedures to be executed and/or data input by the user, for example.

HTTP server 206 can service the client request by, for example, retrieving a return form or file (specified by a URL contained in the HTML document) and transmitting it to client 202 via WWW 204. Further, HTTP server 206 can initiate a program identified in the URL. In the preferred embodiment, the URL specifies CGIMessenger 210 to service the client request. CGIMessenger is a Common Gateway Interface (CGI) script. The following provides an example of a URL:

> http://www.next.com/cgi_bin/cgimessenger/app_name/rcv_form/send_form

A URL has multiple parts. The first part, "http:" specifies the protocol to be used. Other examples of protocol include "ftp:", "gopher:" and "wais". The next part specifies the Internet domain name of the server. In this case, the Internet domain name of the HTTP server is "www.next.com". The next part, "/cgi_bin/cgi_messenger" specifies the path and filename of the desired resource. The resource can be a file, form, or program, for example. In this case, the resource is a common gateway interface program that is used to route requests to applications. The application that processes the client request is specified in the URL with the "app_name" specification. The names of the receiving form (e.g., the form containing the client request) and the sending form (e.g., a reply to the client request) can be included in the URL.

A client request can result in the invocation of application 214 in the server domain 208, for example. The client request is received by the HTTP server 206. The HTTP server 206 initiates CGIMessenger 210. To service the client request, CGIMessenger 210 communicates with HTTP server 206 to obtain information regarding the client request. For example, CGIMessenger 210 obtains the information that accompanied the user request such as form and/or application names and/or user input. The form names can include the name of the form that was submitted to initiate the client request as well as a return form.

The application name identifies the application that services the client request. If an application is specified, CGIMessenger 210 transmits the client request and corresponding information transmitted from HTTP Server 204 to application 214. Application 214 executes an interaction flow to satisfy the user request.

A simple hypertext request (e.g., a request for another form specified in the request) is serviced by HTTP Server 206 by returning the specified form. For requests other than simple hypertext requests, the present invention can execute logic such as CGIMessenger 210 and application 214, for example, to process a client request. The application includes objects such as those created in an objective C, C++, or SmallTalk environment to manage the components of an HTML document (i.e., HTML elements). The behavior defined by the objects manipulate the HTML elements based on the information available to the objects, for example.

Preferably, a user interface (UI) is used to define the HTML elements of a Web page. However, HTML elements can be defined using a text editor. The output of either a UI tool or a text editor is an ASCII, or flat, file that contains definitions for one or more HTML elements. The HTML elements are arranged within the file in the definitional hierarchy (e.g., BODY element is contained within the HTML element).

The HTML elements that define a Web page can be included in a single ASCII file. A file that contains HTML elements is referred to as an HTML template. An HTML template can include a complete definition of the Web page. However, an HTML template may define a subset of the Web page. Two or more HTML templates that define portions of the Web page can be combined to provide a complete definition. The following provides an example of the contents of an HTML template:

TABLE ONE

```
<HTML>
    <BODY>
        This is a list of employees:
        <P>
        <OL>
            <LI> James </LI>
            <LI> Mary </LI>
        </OL>
    </BODY>
</HTML>
```

The above HTML template includes HTML, BODY, Paragraph (P), Ordered List (OL), and List Item (LI) elements. The present invention defines a class for each HTML element. An object class defines instance variables to store information associated with the HTML element such as attributes, or properties, of an HTML element. Methods can be defined to manipulate an HTML element to render (i.e., generate) an HTML document, for example.

Referring to FIG. 2, application 214 includes objects 216. Objects 216 correspond to the HTML elements that define a WWW page. Objects 216 are arranged in a tree structure that corresponds to the hierarchical structure of the HTML elements that they implement. To render an HTML document, application 214 sends a message to the root object 218 to render itself. In response to this message, root object 218 renders the corresponding HTML element(s). Root object 218 sends a message to its children, objects 220A-220B, to render themselves. This process is continued until all of the nodes in the object tree have been processed.

The objects in an object tree are instantiated based on pre-defined object classes. Object classes are defined to manipulate and generate HTML elements in an HTML document. The name of the object class can mirror the names of the corresponding HTML element to provide an easy association between the two. Alternatively, any mapping scheme can be used to map an HTML element to an object class. Instance variables can be used to store property information defined by properties in the HTML element statement. An object class can further contain instance variable declarations to store other information associated with an HTML element.

An object class can have associated method declarations that can be used to manipulate the HTML document. For example, an object class may have a method that varies the display characteristics of the HTML element based on the outcome of some Boolean logic. Further, instance variables can be used to provide a pointer to scripts used with the HTML document.

A script is a type of program that consists of a set of instructions that is read and interpreted by another application. An instruction is an expression that conforms to the rules and syntax expected by a script interpreter. A script language (set of script instructions) may include simple control statements such as loops and if/then expressions.

Since the language does not include complex constructs, the language is easy to master. As with other interpretive languages, a developer does not have to perform steps to translate a script into machine-readable code. Even though a script is interpreted at runtime, it is not considered to cause any degradation in the overall response time (the actual network response times are the primary concern). Therefore, scripts are typically used to provide the logic associated with a Web page.

Appendix A provides a list of some object classes for HTML elements. Additional or modified class definitions can also be used with the present invention. A library of object classes are preferably predefined.

Figure 3:
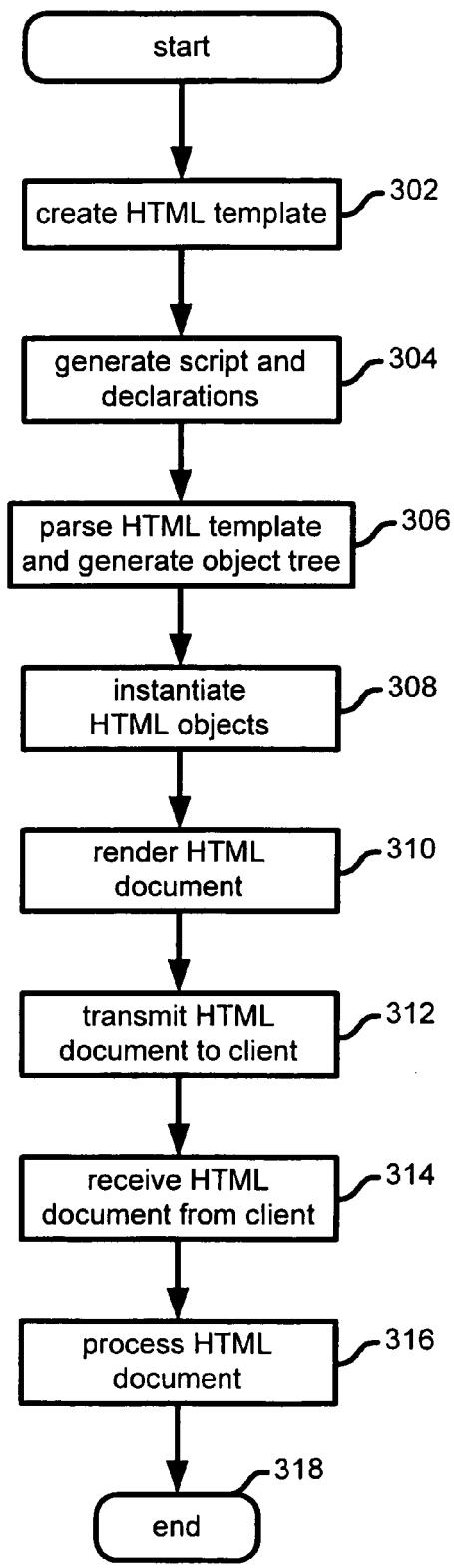
FIG. 3 provides an example of a flow for processing a Web page using the object-oriented capabilities of the invention.

FIG. 3 provides an example of a flow for processing a Web page using the object-oriented capabilities of the invention. At step 302, a Web page developer creates the HTML templates to provide a Web page definition. Alternatively, the Web page can be defined dynamically at runtime without using an HTML template. In this case, there is no need for the developer to perform step 302. The developer generates a script and declarations files needed to process the Web page at step 304. A declarations file contains information that is used to generate the Web page. The HTML template(s), script(s), and declarations file(s) are stored for use when the Web page definition is to be sent to a client browser.

When the Web page definition is requested by a client browser, the associated HTML template(s), script(s), and declarations are retrieved from storage. At step 306, a parser is invoked to parse the statements contained in the HTML template(s). HTML elements are identified by the parser. An object tree is generated based on the HTML elements identified and the hierarchical structure inherent in HTML and defined in the HTML template(s).

An HTML object is instantiated for each of the HTML elements defined in the HTML template(s) at step 308. At step 310, the objects instantiated in step 308 are used to render the Web page definition (i.e., HTML document). The HTML document is sent to the client browser at step 312. The client browser interprets the HTML document and displays the Web page. When the client submits the page, the page is returned to the HTTP server as an HTML document. The HTML document is received at step 314. At step 316, the HTML objects are used to perform the processing based on the client input. Processing ends at step 318.

Figure 4:
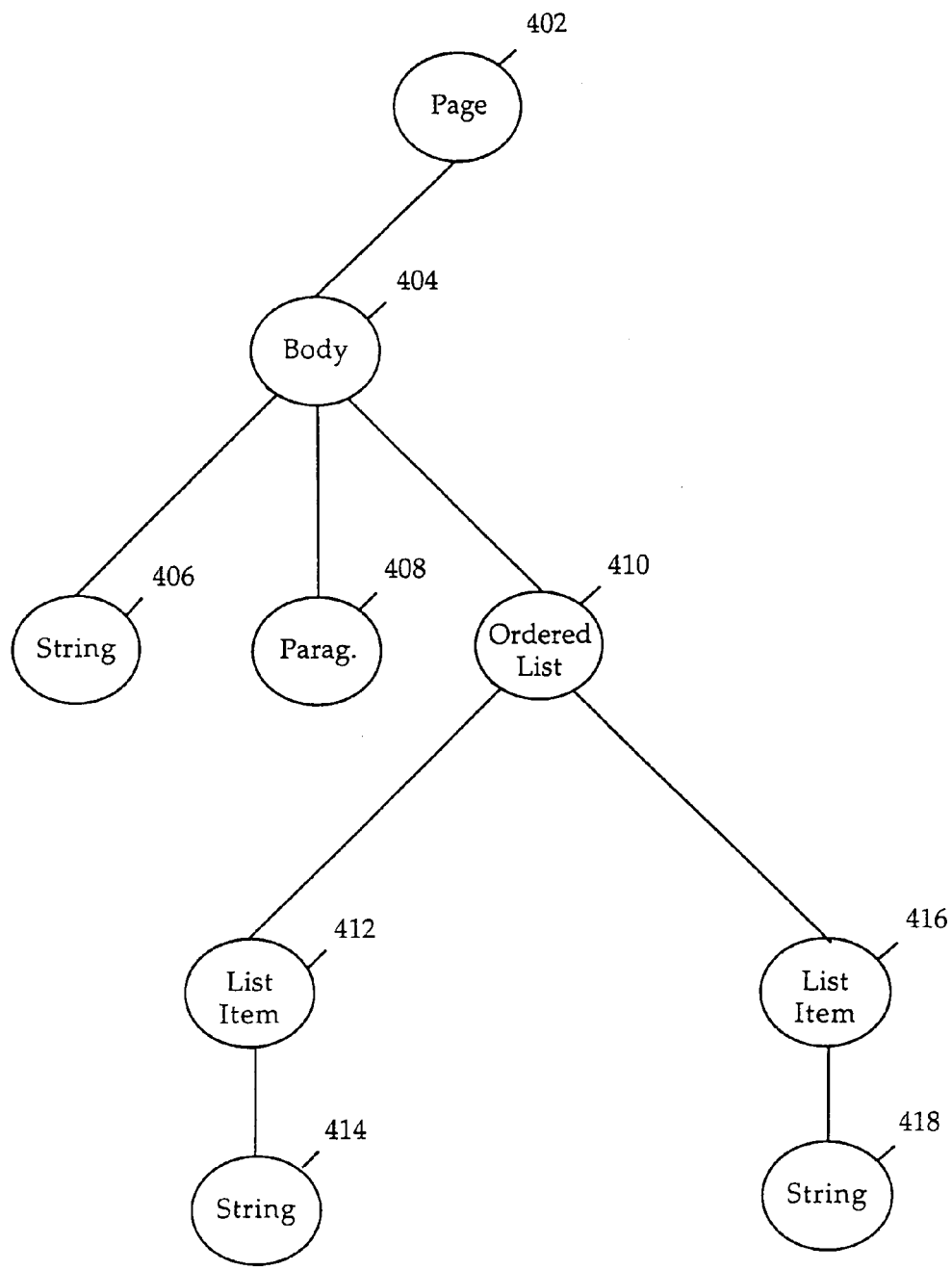
FIG. 4 provides a diagram of the object tree or hierarchy for an HTML template provided in Table One.

The object tree generated during parsing identifies the objects and hierarchy defined in an HTML template. FIG. 4 provides a diagram of the object tree or hierarchy for the HTML template provided in Table One.

Page object 402 corresponds to the HTML element. The BODY element is contained within the HTML element hierarchy. This hierarchy is represented in the object tree by a parent-child relationship. Body object 404 is a child of its parent, page object 402. Similarly, string object 406, paragraph object 408, and ordered list object 410 are children of their parent, body object 404. String object 406 corresponds with the "This is the list of employees:" text string in Table One. Paragraph object 408 and ordered list object 410 correspond with the paragraph and ordered list elements, respectively, in the HTML document. Below the ordered list element is a pairing of a list item element and string element in the HTML document in Table One.

Before an HTML document is sent to the client, the HTML objects render the document. An HTML document consists of HTML statements. HTML statements define HTML elements. An HTML document defines the components of a Web page. The HTML document is sent to client browser 202 from HTTP Server 206, for example. Browser 202 identifies the components of the Web page by parsing the HTML document and generates the Web page.

Figure 5:
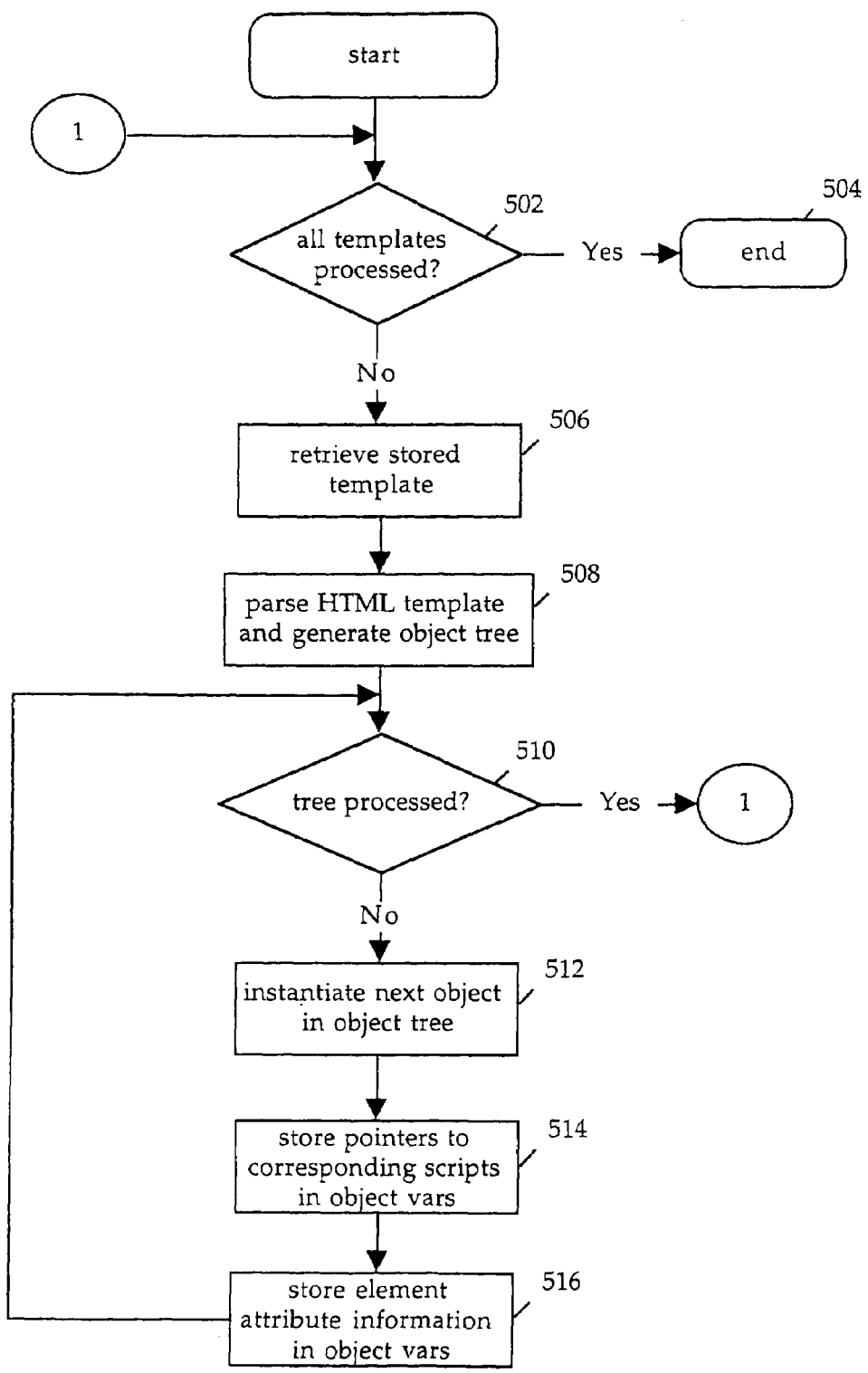
FIG. 5 provides an example of a flow for processing stored templates for an HTML document.

Before the HTML document is transmitted to client browser 202 by HTTP server 206, it is generated using the object-oriented capabilities of the present invention. As previously indicated, an HTML document is defined using HTML templates created using a process such as the one illustrated by FIG. 3. FIG. 5 provides an example of a flow for processing stored templates for an HTML document.

At step 502, a determination is made whether all templates needed to define the HTML document have been processed. If all of the templates have been processed, processing ends at step 504. If all of the HTML templates have not been processed, processing continues at step 506 to retrieve the next stored template. At step 508, the template is parsed and an object tree is generated. Each object identified in the object tree corresponds to an HTML element defined in the HTML template. Each object in the tree corresponds to an object class. For each element in the HTML template, an instance of the corresponding object class is instantiated. At step 510, a determination is made whether all of the objects in the template's object tree have been processed. If they have, processing continues at step 502 to determine whether all of the HTML document's templates have been processed.

If the template's object tree has not been processed, processing continues at step 512 to instantiate the next object in the object tree. At step 514, pointers to a script can be set in the instantiated object's instance variables, for example. Element attribute information is stored in the object's instance variables at step 516. Processing continues at step 510 to process any remaining portion of the object tree.

Figure 6A:
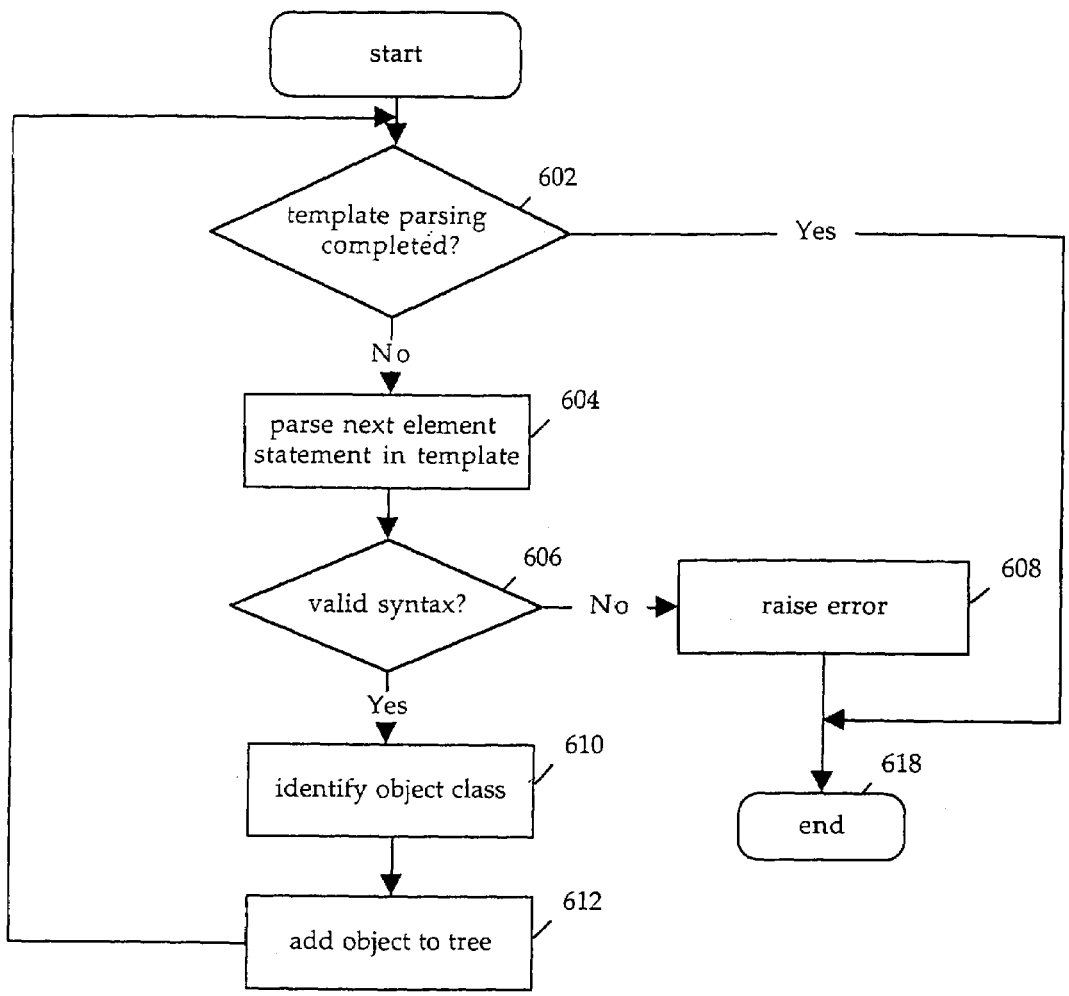
FIG. 6A provides an example of a process flow to parse a template and generate an object tree.

As illustrated in FIGS. 3 and 5, a parsing routine is used at HTML document generation time. Any parser can be used with the present invention. Parsers and parsing routines can be downloaded from various sites on the Internet. The parsing process is performed during document generation to retrieve HTML element information and to generate an object tree. FIG. 6A provides an example of a process flow to parse a template and generate an object tree.

At step 602, a determination is made whether the template has been parsed. If it has, processing ends at step 618. If the template has not been completely parsed, processing continues at step 604 to parse the next element definition in the template. If, at step 606, a determination is made whether a syntax error exists in the element definition, processing continues at step 608 to raise an error condition. If an error occurs, processing ends at step 618. Alternatively, processing can continue to parse the rest of the template.

If no syntax error occurred, the parser proceeds to identify the type of element defined by the current element statement. At step 610, the object class that corresponds to the element type is identified. The object is added to the object tree at step 612. Processing continues at step 602 to determine if additional parsing is necessary.

An HTML document can also be generated without using an HTML template. An object tree can be created dynamically during runtime. PAGE object 402 is instantiated at runtime, for example. During processing, additional HTML objects can be instantiated and inserted into the object tree as children, grandchildren, great-grandchildren, etc. of PAGE object 402. For example, BODY object 404 is instantiated at runtime based on logic contained in an application procedure. BODY object 404 is inserted in the object tree as a child of PAGE object 402. Attributes of the BODY object can be set in the application processing. The remaining portion of the object tree in FIG. 4 can be created dynamically as well.

An object tree that is created dynamically without using HTML templates, or one that is created based on one or more HTML templates can be modified dynamically at runtime. Once the object tree is generated, the HTML statements of an HTML document are generated by sending a "create" message to the objects in the object tree.

There is a standard set of HTML elements that are understood by most of the Web browsers. Some Web browsers offer additional HTML elements or extensions. These extensions provide additional functionality. However, because extensions are not part of the standard HTML, one browser's HTML extension may not be interpretable by another browser.

The extensions offered by client browsers are interpreted on the client side. The present invention provides an extension to HTML that is used on the HTTP server side. The HTML extension is filtered out before a Web page is sent to a client browser. It is used to interpret an HTML template and to render an HTML document before is transmitted to the client browser. Because HTML extensions are not sent to the client browser, there is no need for a client browser to support these extensions. Thus, existing client browsers that support the standard HTML can be used to display HTML documents using the present invention.

The present invention uses an extension to the standard HTML known as the group extension. The group extension provides the ability to combine HTML elements or statements in a single block. A name attribute of the group extension provides the ability to identify the block, or group, by name. The name attribute can be stored in a hash table. During processing, the group identity can be retrieved and used to traverse an object tree.

The group extension also ensures the scoping of named elements (i.e., elements that have a name by virtue of a name attribute). A group object maintains a hash table that includes the named elements which are its members. The group element scopes the named elements within itself. Therefore, two elements having the same name in different groups are distinguishable. Each one is scoped to its respective group. For example, a group element named "Nico" contained within a parent group named "Employee" is distinct from a group named "Nico" within a parent group named "Tourist".

A declarations file is used in combination with the group extension. The declarations file contains additional definition for a group extension. An entry in the declarations file includes a label that links the entry to the group extension. The entry also declares an HTML object. That is, the class of the HTML object is defined. Properties of the HTML object can also be defined within the entry. Values for properties provided in the object class definition can be used to populate the properties in an instance of the object class instantiated for the group.

A declaration entry modifies its associated group by adding elements to the group or modifying the elements that already exist in the group. For example, an HTML object, or element, declared in the entry modifies the group by inserting itself into the group that bears the same name as the declaration entry. Property values that are declared in the declaration entry are used to modify the HTML object's properties.

An NSWTAG marker is used to identify the bounds of the group. The following is an example of a format for an HTML group extension statement using the NSWTAG marker:

<NSWTAG NAME="GREETING"></NSWTAG>

In this example, the group, or NSWTAG extension, does not contain an HTML statement. The NSWTAG extension is identified by the <NSWTAG> and </NSWTAG> delimiters. The NAME portion of the extension specifies the name of the group. This name can be used to link to a declaration in a declaration file. An example of an entry contained in an external definition for "GREETING" is as follows:

GREETING:NSWString {value="Welcome to the Cyber Surfshop"}

The group extension is associated with the declaration file entry using the name attribute in the NSWTAG extension statement. The same name is provided as a label in the declaration file. The label field of an entry is the first field in the entry and is located to the left of the colon (e.g., "GREETING). To the right of the label (after the colon) in the declaration file entry is an indication of an object class. The object class field specifies the class of HTML object that is to be instantiated and inserted in the "GREETING" group. The "NSWString" specification in the "GREETING" entry results in the creation of an instance of the "NSWString" HTML object class. The NSWString class provides object cover for free-floating text. The "NSWString" HTML object instance inserts itself into the "GREETING" group.

The declaration contains a property field (i.e., delimited by brackets). The property field, value, is used to initialize a property in the "NSWString" HTML object. The value field contains the text that is to be inserted into the HTML document. When the "GREETING" group portion of the object is rendered, a "create" message is sent to the "GREETING" group object. It does not generate any HTML statements in the HTML document. However, it sends a "create" message to its children. As its child, the "NSWString" HTML object receives the "create" message. The "NSWString" HTML object inserts the text contained in the value property into the HTML document.

Figure 7A:
FIG. 7A provides an example of a Web page that contains a repeating element.
Figure 7A:
Figure 7A:

The group extension can be used to insert a block of HTML statements into an HTML document. The block of HTML statements can occur once in the HTML template. The block can also be repeated within the HTML document. FIG. 7A provides an example of a Web page that contains block that is repeated (i.e., a repeating subcomponent).

Web page 702 provides a list of a client's unread electronic mail. As displayed in Web page 702, a mail item 704 contains information about the sender (name and image), subject, and content of the mail message. Mail item 704 is repeated for each piece of electronic mail. A horizontal rule separates each mail item. The sender, subject, content and horizontal rule elements constitute the repeating subcomponent of Web page 702.

Figure 7B:
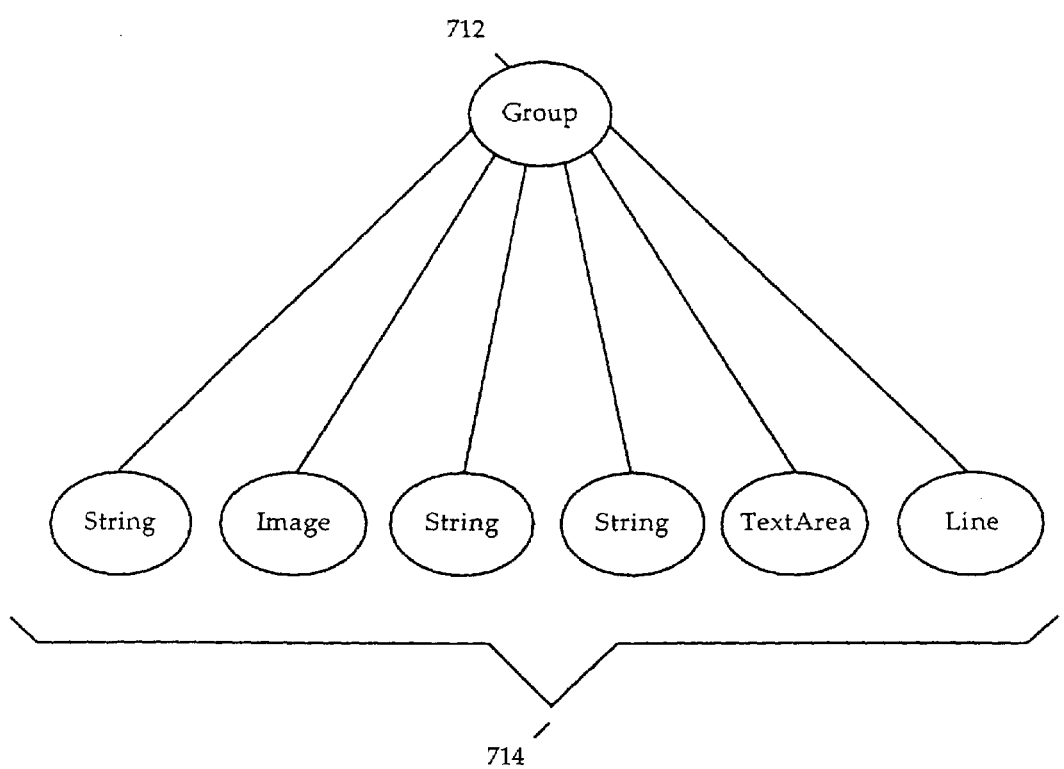
FIG. 7B provides an example of the object tree for a repeating subcomponent of a Web page.

A group element acts outer block of a group of HTML elements that generate the HTML statement block (either repeating or nonrepeating). In an object tree, the group object acts as the root for the HTML objects that correspond to the HTML elements. FIG. 7B provides an example of the object tree that is symbolic of the repeating subcomponent of Web page 702 of FIG. 7A. The group object 712 is the parent of the objects 714 contained within the group. Each of the objects 714 contained within the group are children of group object 712. The children of group object 712 (i.e., objects 714) can be repeated to handle the number of mail items to be displayed to the client.

In addition to defining the root of a repeating component, the group extension can be used to define the root of a subtree. The subtree can be combined with other trees or subtrees to generate a complete object. The combined object tree can be used to render a Web page. Thus, for example, Web page 702 may be defined in two separate HTML templates. One template defines the repeating portion and the other defines the non-repeating portion. FIG. 7B provides the object tree for the HTML template that defines the repeating portion of Web page 702. The group extension can be defined in both templates such that the two templates can be combined to generate a single HTML document.

Group extension scan be nested in the same way that HTML elements are nested within each other. An outer group provides scoping for an inner group. Therefore, a parent group object provides scoping for its children. Table Two provides an example of HTML that includes an NSWTAG extension.

TABLE TWO

```
<HTML>
    <NSWTAG NAME="SELECT_FORM">
        <FORM>
            ...
            <NSWTAG NAME="SAILBOARDS">
                <NSWTAG NAME="CHECK"><INPUT
                TYPE="checkbox"></NSWTAG>
                <NSWTAG NAME="NAME"></NSWTAG>
            </NSWTAG>
            ...
        </FORM>
    </NSWTAG
    ...
</HTML>
```

The first NSWTAG extension provides an identifier for the block containing the form element. The NSWTAG statement includes a name attribute, "SELECT_FORM", to identify this block, or group. Within the "SELECT_FORM" block, a "SAILBOARDS" NSWTAG extension provides an identifier for a repeating subcomponent of the HTML. There are two NSWTAG extensions within the repeating subcomponent (i.e., "CHECK" and "NAME"). An input HTML element is nested within each of these NSWTAG extensions.

The declarations file that is associated with the HTML in Table Two contains further definition for the NSWTAG extensions. For example, the outer NSWTAG extension (i.e., "SELECT_FORM") has the following associated entry in the declarations file:

SELECT_FORM:NSWForm {action=onSelection( )};

The label portion of the declaration file entry (i.e., "SELECT_FORM") links the entry with the NSWTAG extension in the HTML template having the same name. The next field in the entry (i.e., located to the right of the colon) indicates that an instance of the NSWForm object class should be instantiated and inserted within the SELECT_FORM group object. Following the element/object specification, the entry includes a value for a property or attribute of the NSWFORM object. That is, the action attribute is assigned the value of "onSelection( )". The "onSelection( )" value indicates the procedure to invoke in the script associated with the HTML document when an action is taken by the client, for example.

The NSWTAG extension named "SAILBOARDS" is contained within the SELECT_FORM group. It also begins a repeating subcomponent. An example of the declarations file entry associated with the "SAILBOARDS" NSWTAG extension is as follows:

```
SELECT_FORM.SAILBOARDS:NSWRepetition
    {list=sailboards; item=sailboard;
```

The label in the declarations file entry specifies that the entry is associated with the "SAILBOARDS" group that is within the SELECT_FORM group. The entry further indicates that the "SAILBOARDS" group is a repetition group. The "SAILBOARDS" group can cause a block of HTML statements to be repeated in the HTML document. The NSWRepetition specification in the entry indicates that an repetition object should be instantiated to process the repeating subcomponent. The repetition object can contain HTML objects that generate a multiple occurrences of an HTML statement block. The number of times, N, that the block is repeated is based on data that is to be loaded into the HTML (e.g., list of sailboards).

The list attribute specified in the "SELECT_FORM.SAILBOARDS" declarations file entry points to a container object (i.e., object that holds other objects), "sailboards". The item attribute points to the information to be retrieved to populate the repeating subcomponent for the "SAILBOARDS" repetition group.

The HTML template and the declarations file contains entries that further define the "SELECT_FORM.SAILBOARDS" repetition group. Two group extensions are contained within the "SELECT_FORM.SAILBOARDS" nested group structure in the HTML template. These groups, "CHECK" and "NAME", have the following declarations, respectively:

```
SELECT_FORM.SAILBOARDS.CHECK:NSWInput
    {value=sailboard, return=selectionArray};

SELECT_FORM.SAILBOARDS.NAME:NSWString
    {value=sailboard};
```

An object of class "NSWInput" is instantiated based on the specification in the "CHECK" NSWTAG statement and the "SELECT_FORM.SAILBOARDS.CHECK" declaration file entry. It inserts itself within the "SELECT_FORM.SAILBOARDS.CHECK" nested group.

Preferably, property values of the newly instantiated HTML object are retrieved from its corresponding declaration. However, property information can be defined in the HTML template. For example, the "SELECT_FORM.SAILBOARDS.CHECK" group HTML element in the HTML template specifies the type property (i.e., "text) for the NSWInput HTML object. This property could have been specified in the corresponding declaration.

The "SELECT_FORM.SAILBOARDS.CHECK" declaration contains property information. The "value" attribute points to a sailboard object that contains the name of the first/next sailboard to populate the repeating subcomponent in the HTML document. The return attribute specifies the variable, "selectionArray" into which an input value is pushed when the HTML document returns from the client. The HTML object that is instantiated from the "SELECT_FORM.SAILBOARDS.CHECK" declaration generates an INPUT HTML statement of type "checkbox" when it is receives the "create" message.

The "SELECT_FORM.SAILBOARDS.NAME" declaration file entry identifies the NSWString object class. An NSWString object is instantiated and inserted into the SELECT_FORM.SAILBOARDS" nested group. The "NSWString" object generates a string that is equal to the value of the first/next sailboard.

The NSWTAG extension can be replaced using data stored in properties of the object(s) associated with the HTML element and NSWTAG extension. Table Three provides an example of HTML including NSWTAG extensions contained within an ordered list HTML element. The NSWTAG extensions provide associations to entries in the declarations file that point to data stored in object properties.

TABLE THREE

```
<HTML>
    <NSWTAG NAME="SELECT_FORM">
        <FORM>
            ...
            <OL>
                <NSWTAG NAME="WEBPEOPLE">
                    <NSWTAG NAME="FN"><INPUT TYPE="text">
                    </NSWTAG>
                    <NSWTAG NAME="LN"><INPUT TYPE="text">
                    </NSWTAG>
                    <P>
                </NSWTAG>
            </OL>
            ...
        </FORM>
    </NSWTAG
    ...
</HTML>
```

A "WEBPEOPLE" NSWTAG extension is contained within the "SELECT_FORM" NSWTAG extension. The "WEBPEOPLE" NSWTAG extension includes two nested group HTML elements. Associated with each HTML group elements is a corresponding declaration file entry. The following provides an example of declaration file entries for the "WEBPEOPLE", "FN", and "LN" NSWTAG extensions, respectively:

```
SELECT_FORM.WEBPEOPLE:NSWRepetition
    {list=web_dept; item=employee};

SELECT_FORM.WEBPEOPLE:FN:NSWInput
    {value=employee.fn};

SELECT_FORM.WEBPEOPLE.LN:NSWInput
    {value=employee.ln};
```

The "WEBPEOPLE" declaration file entry indicates that the "WEBPEOPLE" NSWTAG extension is a repeating subcomponent or group of HTML. Group objects are instantiated for each. When the HTML document is rendered, the "WEBPEOPLE" group object sends a "create" message to the "FN" and "LN" group objects. The "FN" and "LN" group objects send a "create" message to the two "NSWInput" objects instantiated as a result of the "SELECT_FORM.WEBPEOPLE.FN" and "SELECT_FORM.WEBPEOPLE.LN" declarations. The declarations specify the data associated with the "fn" and "ln" properties of an employee object. The "NSWInput" objects generate HTML statements in the HTML document using the values of the "fn" and "ln" properties of the employee object.

The "FN" and "LN" groups are contained within the "WEBPEOPLE" group. The "WEBPEOPLE" group is a repetition group. Therefore, "FN" and "LN" groups can be activated multiple times to generate HTML statement blocks within the HTML document.

Figure 6B:
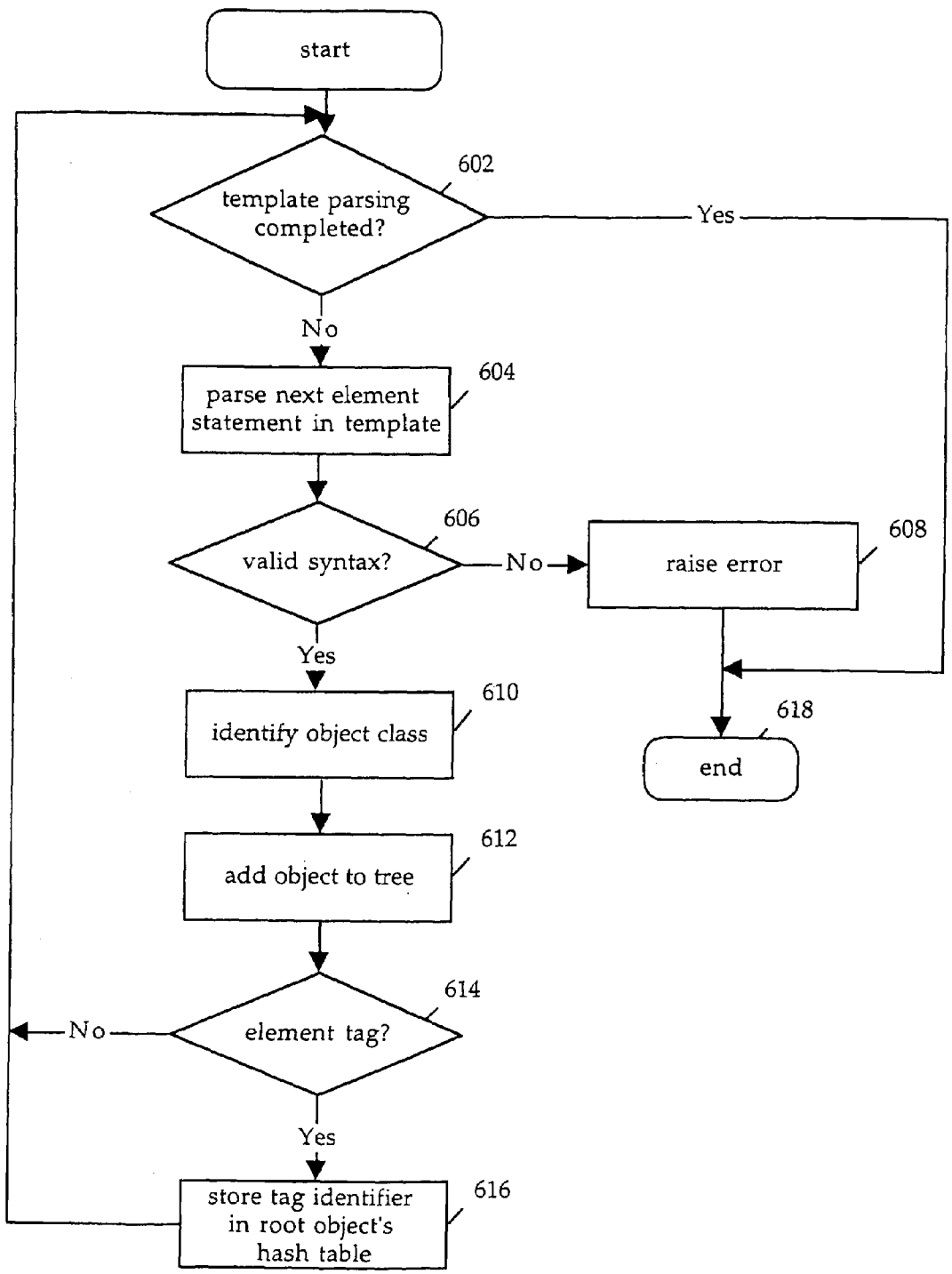
FIG. 6B modifies the flow provided in FIG. 6A to include steps to add tag name to a hash table.

The name property of the group, or NSWTAG, extension provides the ability to identify the group and the statements contained within the group. During parsing, a name property associated with a group can be stored in a hash table. During processing, an object can be located by traversing the object tree. Preferably, however, one object can retrieve group names from the hash table to locate another object within the object tree. FIG. 6B modifies the flow provided in FIG. 6A to include steps to add tag name information to a hash table.

Steps 614 and 616 are added to the flow. After the object is added to the object tree at step 612, a determination is made whether the parsed statement contained a name property. If there is no name property, processing continues at step 602 to process any remaining elements of the HTML template. If a name property is defined, processing continues at step 616 to store the identifier in the hash table. Processing continues at step 602 to process any remaining elements of the HTML template.

Thus, a method and apparatus for generating object-oriented world wide web pages is provided.

APPENDIX A

| Class | Description |
| --- | --- |
| NSWHAnchor | Object cover for Anchor HTML element |
| NSWHCheckbox | Object cover for Input HTML element, type is "checkbox" |
| NSWHComment | Object cover for comments |
| NSWHElement | |
| NSWHForm | Object cover for Form HTML element |
| NSWHGroup | Cover for group extension. A group is a container for other objects. |
| NSWHImage | Object cover for Image HTML element |
| NSWHImageInput | Object cover for Input HTML element, type is "image" |
| NSWHImagemapRegion | |
| NSWHInput | Abstract class for input HTML elements. All input HTML elements subclass this class |
| NSWHKeyValueCoding | Defines methods to maintain a dictionary of data values associated with keys. Values can be extracted from the dictionary to initialize an object, or retrieved from an object and stored in the dictionary. |
| NSWHList | A generic container class for HTML elements that can contain other elements or plain text. This class can be used for HTML elements that do not covered by another object class |
| NSWHListItem | Object cover for List Item HTML element |
| NSWHMarkedElement | |
| NSWHMenu | Object cover for Menu HTML element |
| NSWHOption | Object cover for Option HTML element |
| NSWHOrderedList | Object cover for Ordered List HTML element |
| NSWHPage | |
| NSWHRadio | Object cover for Input HTML element, type is "radio" |
| NSWHRectRegion | |
| NSWHRepetitionGroup | Object cover for repeating group HTML extension |
| NSWHReset | Object cover for Input HTML element, type is "reset" |
| NSWHSelect | Object cover for Select HTML element |
| NSWHString | Object cover for free-floating HTML text |
| NSWHSubmit | Object cover for Input HTML element, type is "submit" |
| NSWHText | Object cover for Input HTML element, type is "text" |
| NSWHTextArea | Object cover for TextArea HTML element |
| NSWHParser | |
| NSWHUnknownElement | Object cover for Unordered List HTML element |
| NSWHUnorderedList | Object cover for Input HTML element |
| NSWHUrl | Object cover for Uniform Resource Locator |
| NSWHUrn | Object cover for URN |

The invention claimed is:

1. A computer-implemented method of dynamically generating a web page, comprising:
    obtaining an object tree comprising a plurality of hierarchically organized software objects, each software object containing data and methods for processing a corresponding Hypertext Markup Language (HTML) element of said web page; and
    using the plurality of hierarchically organized objects to generate, dynamically at runtime, a plurality of HTML statements, each HTML statement being associated with one or more HTML elements of said web page and each HTML statement being generated using the data and methods of a corresponding software object included in said plurality of hierarchically organized objects;
    wherein each of at least two software objects comprising said plurality of software objects generates at least one of said plurality of HTML statements.

2. The method of claim 1, further comprising generating said object tree dynamically at runtime.

3. The method of claim 1, wherein said object tree is generated based at least in part on a template associated with the web page.

4. The method of claim 3, wherein the template comprises a hierarchy of HTML statements, each HTML statement corresponding to a HTML element of the web page.

5. The method of claim 3, wherein the hierarchical organization of said object tree is based at least in part on a hierarchical page structure defined by said template.

6. The method of claim 1, further comprising determining dynamically at runtime a hierarchical page structure of said web page.

7. The method of claim 6, wherein the hierarchical organization of said plurality of hierarchically organized objects is based at least in part on said hierarchical page structure.

8. The method of claim 1, further comprising making a modification to said object tree prior to using the plurality of hierarchically organized objects to generate a plurality of HTML statements for the web page.

9. The method of claim 1, wherein the plurality of HTML statements comprise a web page document and further comprising transmitting the web page document to a client via a network.

10. The method of claim 1, wherein plurality of HTML statements comprise statements in a text-based markup language usable to define one or more of the format and the content of a web page element.

11. The method of claim 1, wherein said object tree comprises a root object representing a root element of said web page and using the plurality of hierarchically organized objects to generate, dynamically at runtime, a plurality of HTML statements comprises sending to said root element a message that initiates the generation of said plurality of HTML statements.

12. The method of claim 11, wherein said message causes the root object to send to its immediate child objects an instruction that causes each immediate child object of the root object to render itself by generating one or more corresponding HTML statements and to send a further instruction to its own immediate child objects, if any, to render themselves and cause their own immediate child objects, if any to render themselves, and so on, until all objects in the tree have received an instruction to render themselves.

13. The method of claim 1, wherein two or more of said plurality of hierarchically organized objects comprises a group of associated objects.

14. The method of claim 13, wherein using the plurality of hierarchically organized objects to generate a plurality of HTML statements comprises using the group of associated objects to generate one or more HTML statements associated with the group.

15. The method of claim 13, wherein the group has associated with it a group extension.

16. The method of claim 13, wherein using the group of associated objects to generate one or more HTML statements associated with the group comprises using the group of object to generate one or more standard HTML statements that do not require knowledge of the group extension to render.

17. The method of claim 13, wherein the group extension has associated with it a declarations file that defines an aspect of the group extension.

18. The method of claim 17, wherein the declarations file comprises an entry that adds to or modifies an element of the group.

19. A computer program product for dynamically generating a web page, the computer program product being embodied in a computer readable medium and comprising computer instructions for:
- obtaining an object tree comprising a plurality of hierarchically organized software objects, each software object containing data and methods for processing a corresponding HTML element of said web page; and
- using the plurality of hierarchically organized objects to generate, dynamically at runtime, a plurality of HTML statements, each HTML statement being associated with one or more HTML elements of said web page and each HTML statement being generated using the data and methods of a corresponding software object included in said plurality of hierarchically organized objects;

wherein each of at least two software objects comprising said plurality of software objects generates at least one of said plurality of HTML statements.

20. A computer system, comprising:
- a processor configured to:
  - obtain an object tree comprising a plurality of hierarchically organized software objects, each software object containing data and methods for processing a corresponding HTML element of a web page; and
  - use the plurality of hierarchically organized objects to generate, dynamically at runtime, a plurality of HTML statements, each HTML statement being associated with one or more HTML elements of said web page and each HTML statement being generated using the data and methods of a corresponding software object included in said plurality of hierarchically organized objects; and
- a memory configured to store said object tree;

wherein each of at least two software objects comprising said plurality of software objects generates at least one of said plurality of HTML statements.

\* \* \* \* \*